(12) United States Patent
Shimakata et al.

(10) Patent No.: US 8,248,264 B2
(45) Date of Patent: Aug. 21, 2012

(54) MEASURING APPARATUS

(75) Inventors: Tetsuya Shimakata, Tokyo (JP); Miho Egawa, Tokyo (JP)

(73) Assignee: Azbil Corporation, Tokyo (JP)

( * ) Notice: Subject to any disclaimer, the term of this patent is extended or adjusted under 35 U.S.C. 154(b) by 263 days.

(21) Appl. No.: 12/810,629

(22) PCT Filed: Dec. 1, 2008

(86) PCT No.: PCT/JP2008/071787
§ 371 (c)(1),
(2), (4) Date: Jun. 25, 2010

(87) PCT Pub. No.: WO2009/084357
PCT Pub. Date: Jul. 9, 2009

(65) Prior Publication Data
US 2010/0265085 A1    Oct. 21, 2010

(30) Foreign Application Priority Data
Dec. 28, 2007 (JP) ................................. 2007-339658

(51) Int. Cl.
*G08B 3/00* (2006.01)
(52) U.S. Cl. .................. 340/691.3; 340/506; 340/525; 340/539.16; 340/539.17; 340/539.22; 340/539.26; 340/691.1; 340/691.2; 340/691.4; 340/691.5; 340/691.6; 700/17; 700/83

(58) Field of Classification Search .................. 340/506, 340/505, 539.16, 539.17, 539.22, 539.26, 340/691.1–691.6; 700/17, 83
See application file for complete search history.

(56) References Cited

U.S. PATENT DOCUMENTS
5,631,629 A * 5/1997 Fooks et al. ................... 340/500
2005/0062599 A1 * 3/2005 Neubauer et al. ............. 340/506

FOREIGN PATENT DOCUMENTS
| JP | 55-85997 A | 6/1980 |
| JP | 60-246414 A | 12/1985 |
| JP | 1-263793 A | 10/1989 |
| JP | 2-128115 A | 5/1990 |
| JP | 4-315296 A | 11/1992 |
| JP | 2000-248967 A | 9/2000 |
| JP | 2002-248967 A | 9/2002 |

* cited by examiner

*Primary Examiner* — George Bugg
*Assistant Examiner* — Ojiako Nwugo
(74) *Attorney, Agent, or Firm* — McDermott Will & Emery LLP

(57) ABSTRACT

When a major failure is detected, display of a measurement value on a display section is stopped, and instead of the measurement value, an abnormal code, which indicates the contents of the major failure, is displayed on the display section. When a minor failure is detected, an abnormal code, which indicates the contents of the minor failure, and a measurement value are alternately displayed on the display section by being switched one from the other.

7 Claims, 9 Drawing Sheets

FIG. 13

| Status Category | Detailed Status | Content of Display (A Box Indicates a Blank Space) | |
|---|---|---|---|
| Normal | No Status | 123.45 | TB1 |
| Major Fault | Major Fault (High) | Err.01 | |
| | | Err.02 | |
| | | Err.03 | |
| | | Err.04 | |
| | | Err.05 | |
| | | Err.06 | |
| | | Err.07 | |
| | Major Fault (Low) | Err.08 | |

FIG. 14

| Status Category | Detailed Status | Content of Display (A Box Indicates a Blank Space) | |
|---|---|---|---|
| Minor Fault | Minor Fault (High) | □AL.01 | TB2 |
| | | □AL.02 | |
| | | □AL.03 | |
| | | □AL.04 | |
| | | □AL.05 | |
| | | □AL.06 | |
| | | □AL.07 | |
| | Minor Fault (Low) | □AL.08 | |

MEASURING APPARATUS

CROSS REFERENCE TO PRIOR APPLICATIONS

This application is a U.S. National Phase application under 35 U.S.C. §371 of International Application No. PCT/JP2008/071787, filed on Dec. 1, 2008 and claims benefit of priority to Japanese Patent Application No. 2007-339658, filed on Dec. 28, 2007. The International Application was published in Japanese on Jul. 9, 2009 as WO 2009/084357 under PCT Article 21(2). All these applications are herein incorporated by reference.

FIELD OF TECHNOLOGY

The present invention relates to a measuring device for measuring and displaying a specific physical quantity such as a differential pressure.

PRIOR ART

Conventionally, measuring devices, such as differential pressure transmitting devices that measure differential pressures, have been installed in on-site processes and have detected specific physical quantities, and have display units for calculating and displaying measured values based on the physical quantities that have been detected.

Among this type of measuring device there are sophisticated devices that have diagnostic functions for detecting various types of faults, where, if some sort of fault has been detected by the diagnostic function, a fault code, that indicates the type of fault, is displayed on the display unit.

As a method for displaying the fault code in such a case, a display method may be used wherein, for example, a display unit DS1 for the measured value and a separate display unit DS2, for the fault code, are provided, as illustrated in, for example, FIG. 17, and the fault code is displayed on the display unit DS2. (See, for example, Japanese Unexamined Patent Application Publication 2000-248967.)

However, in the method for displaying fault codes as illustrated in FIG. 17, there is the need to provide a fault code display unit DS2 that is separate from the measured value display unit DS1, which is costly.

Additionally, in the method for displaying fault codes as illustrated in FIG. 17, the measured value is displayed continuously on the display unit DS1, regardless of the type of fault that has been detected. In this case, the types of faults that there may be are: faults that have an impact on the reliability of the measured value (major faults (type 1 faults)), and faults that have no impact on the reliability of the measured value (minor faults (type 2 faults)). In the case of major faults, even if a measured value is displayed, the measured value is meaningless, and, conversely, displaying a measured value that has no reliability may cause problems in that it may cause the individual who is performing the monitoring to draw incorrect understandings.

In contrast, one may consider a display method wherein there is only a single display unit DS1 for the measured value, as illustrated in FIG. 18, and some sort of fault is detected, then the display of the measured value by the display unit DS1 is terminated and, instead of the measured value, the fault code is displayed on the display unit DS1. This makes it possible to get by with only a single display unit, which is less expensive.

However, in the display method for the fault code illustrated in FIG. 18, the display of the measured value by the display unit DS1 is terminated regardless of the type of fault that has been detected, and the fault code is displayed on the display unit DS1 instead of the measured value. In this display method, the unreliable measured value will not be displayed in the case of a major fault, and thus the person doing the monitoring will be given a correct understanding. However, in the case of a minor fault, the display of the measured value is terminated, regardless of there being some degree of reliability in the measured value and regardless of its usefulness in analyzing the fault, which becomes an impediment in monitoring the measured values.

The present invention is to resolve the type of issue set forth above, and the object thereof is to provide a measuring device that enables continuous monitoring of a measured value when a minor fault has occurred, and that can be structured with a single display unit for information indicating the measured value and the details of the fault.

SUMMARY OF THE INVENTION

The present invention, in order to achieve the object as set forth above, includes: a sensor for detecting a specific physical quantity; calculating means for calculating a measured value based on a physical quantity detected by the sensor; fault detecting means for detecting a type 1 fault that has an influence on the reliability of the measured value and a type 2 fault for that does not have an influence on the reliability of the measured value; a display unit for displaying a measured value and information indicating the details of a type 1 fault and/or information indicating the details of a type 2 fault; and display controlling means for controlling the display unit so as to display, instead of the measured value, information indicating the detail of the type 1 fault when the fault that has been detected by the fault detecting means is a type 1 fault, and for controlling the display unit to display information indicating the detail of the type 2 fault, together with the measured value when the fault detected by the fault detecting means is a type 2 fault.

Given this invention, when a type 1 fault (wherein, in the below, this fault may also be termed a "major fault" for convenience in the present invention) has occurred, information indicating the detail of the major fault is displayed on a single display unit instead of the measured value. When a type 2 fault (wherein, in the below, this may also be termed a "minor fault" for convenience in the present invention) has occurred, information indicating the detail of the minor fault is displayed along with the measured value on the single display device.

Given the present invention, when a major fault (a type 1 fault) has occurred, information indicating the detail of the major fault is displayed, instead of the measured value, on a single display unit, and when a minor fault (a type 2 fault) has occurred, information indicating the detail of the minor fault is displayed, together with the measured value, on the single display unit, and thus a display unit for the measured value and for the information indicating the detail of the fault can be structured inexpensively as a single unit, and the monitoring of the measured value can be continued when a minor fault has occurred.

BRIEF DESCRIPTION OF THE DRAWINGS

FIG. 13 is a diagram for illustrating major fault diagnostic items that are executed by the diagnostic program, and fault codes that are outputted when major faults are detected.

FIG. 14 is a diagram for illustrating minor fault diagnostic items that are executed by the diagnostic program, and fault codes that are outputted when minor faults are detected.

DETAILED DESCRIPTION OF THE INVENTION

The present invention will be explained in detail below, based on the drawings.

Display Example 1

Figure 1:
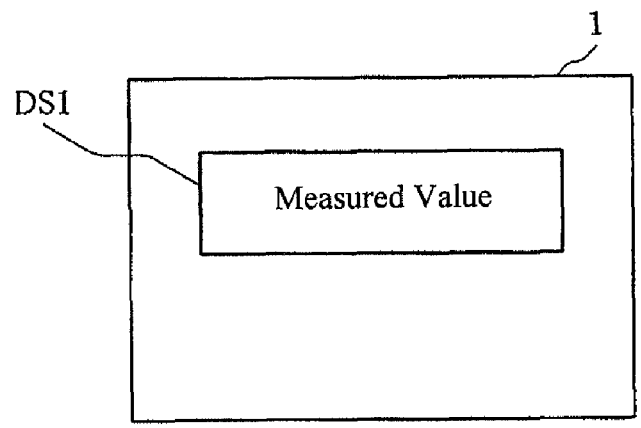
FIG. 1 is a diagram for explaining an example display of a fault code in a measuring device according to the present invention for the case wherein no fault has occurred.
Figure 2:
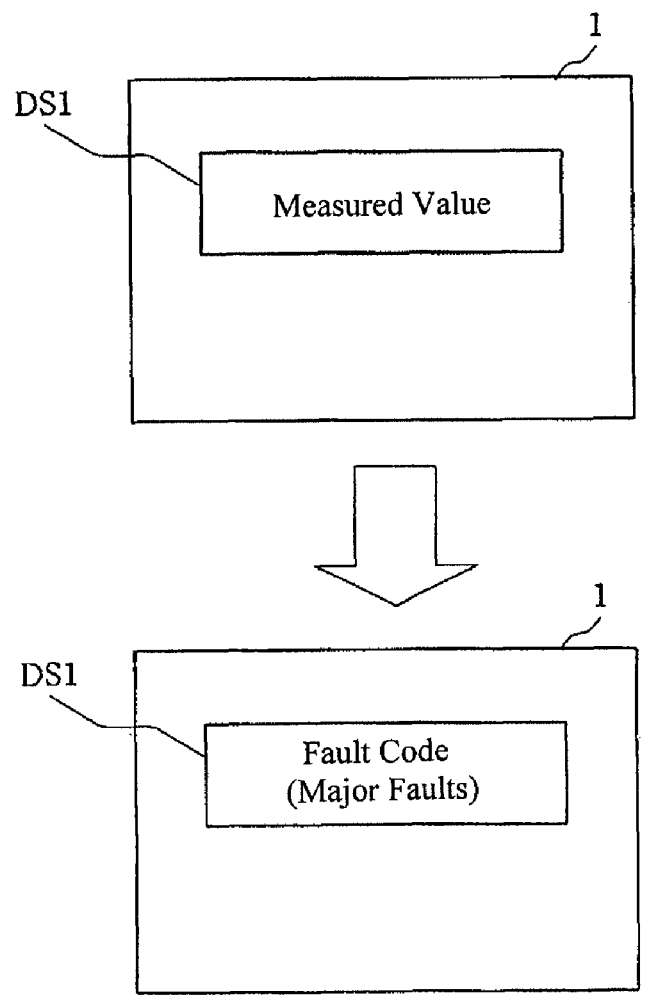
FIG. 2 is a diagram for explaining a first example display of a fault code in a measuring device according to the present invention for a case wherein a major fault (a type I fault) has occurred.
Figure 3:
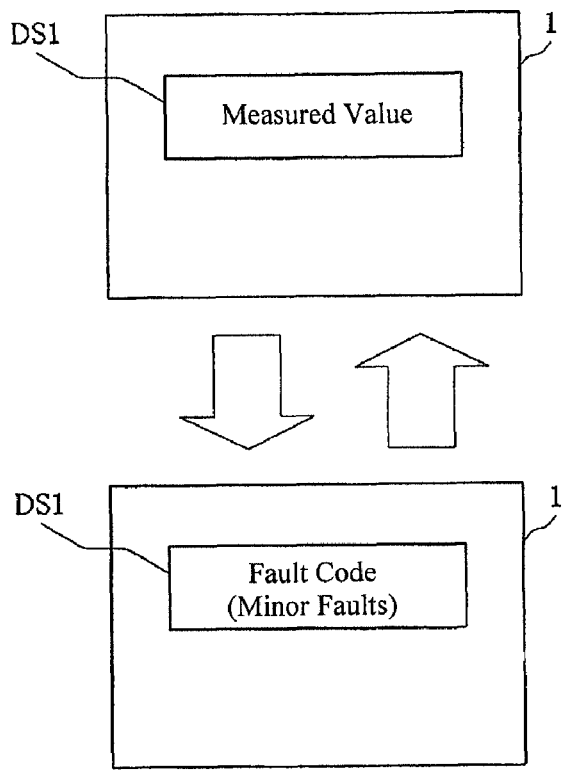
FIG. 3 is a diagram for explaining a first example display of a fault code in a measuring device according to the present invention (a diagram illustrating a case wherein a minor fault (a type 2 fault) has occurred).

FIG. 1 through FIG. 3 are diagrams for explaining an example of a display of fault codes in a measuring device according to the present invention. FIG. 1 illustrates the case wherein no fault has occurred, FIG. 2 illustrates the case wherein the fault that has an influence on the reliability of the measured data (a major fault (a type 1 fault)) has occurred, and FIG. 3 illustrates a case wherein a fault that does not influence the reliability of the measured value (a minor fault (a type 2 fault)) has occurred.

In the first example display, the measuring device is a differential pressure transmitter 1, where only a display unit DS1 for the measured value is provided in the differential pressure transmitter 1. (See FIG. 1.) The differential pressure transmitter 1 has a diagnostic function for detecting various types of faults, where major faults and minor faults are detected by this diagnostic function.

Example of Display when a Major Fault has been Detected:

When a major fault has been detected, the differential pressure transmitter 1 terminates the display of the measured value on the display unit DS1, and instead of the measured value, displays, on the display unit DS1, a fault code that indicates the detail of the major fault. (See FIG. 2.) The differential pressure transmitter 1 displays continuously the fault code that indicates the detail of the major fault during the interval over which the major fault is detected.

Example of Display when a Minor Fault has been Detected:

When a minor fault has been detected, the differential pressure transmitter 1 alternatingly switches between displaying a fault code that indicates the detail of the minor fault and displaying the measured value on the display unit DS1. (See FIG. 3.) Over the interval over which the minor fault is detected, the differential pressure transmitter alternatingly switches between the fault code that indicates the minor fault and the measured value.

This type of fault code displaying method makes it possible to structure the display unit for the measured value and for information indicating the detail of the failure as a single display unit, and makes it possible to monitor the measured value continuously, even when a minor fault has occurred.

Note that in this display, if a minor fault has occurred, then the fault code that indicates the detail of the minor fault and the display value are displayed switched alternatingly on the display unit DS1. However, as illustrated in FIG. 4, extra display digits for the measured value may be provided in the display unit DS1, or in other words, extra digits 1b, in addition to the display digits 1a for the measured value, may be provided, and information indicating the detail of the minor fault may be displayed in these extra digits 1b that are provided.

Figure 4:
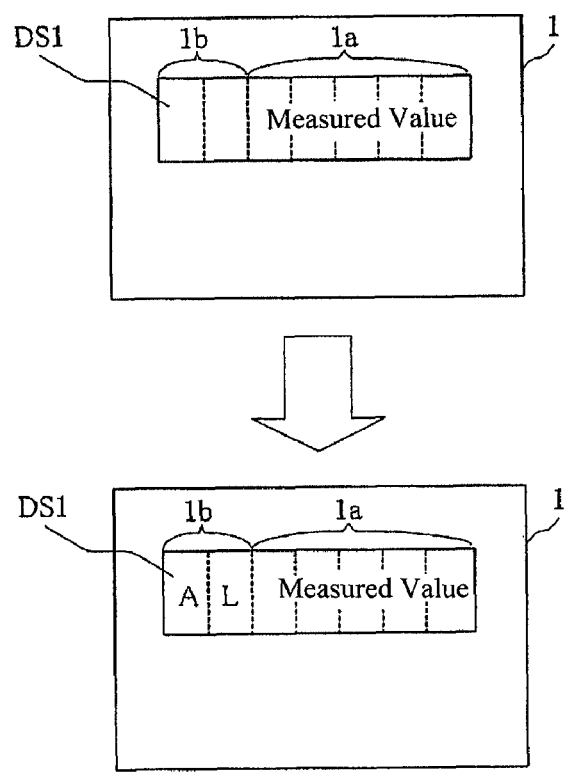
FIG. 4 is a diagram for explaining an example wherein extra display digits are provided for the measured value to display information indicating the details of the minor faults.

In the example illustrated in FIG. 4, of the fault codes that indicate the detail of the minor fault, the letters "Al", indicating that there is a minor fault, are displayed. The letters "Al", indicating that this is a minor fault, are included in the definition of information that indicates the detail of a type 2 fault (a minor fault) in the present invention.

Display Example 2

When Faults of Multiple Types are Detected

In the first example display, the discussion was for discriminating between a major fault and a minor fault; however, there are various types of major faults and minor faults. That is, major faults of multiple types may be detected, and minor faults of multiple types may be detected.

Figure 5:
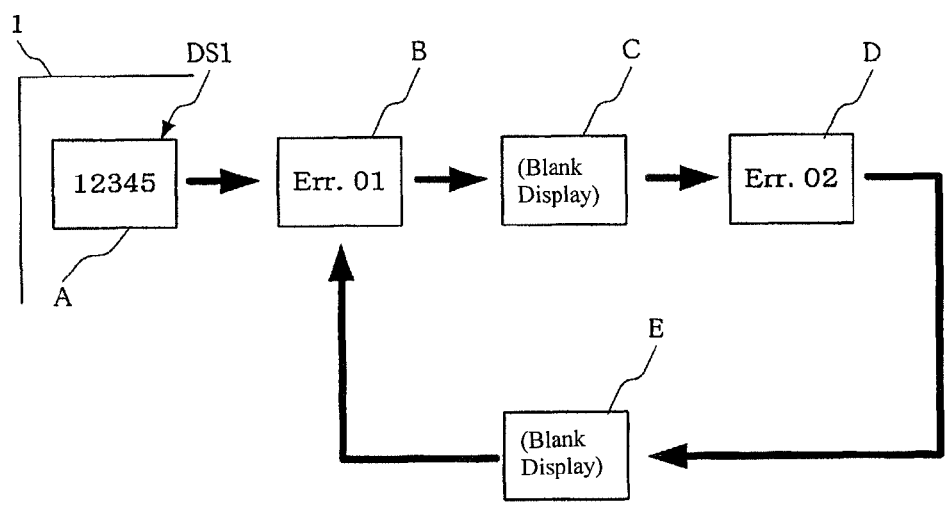
FIG. 5 is a diagram for explaining an example display of a fault code in a case wherein major faults of a plurality of types have been detected.

When Multiple Types of Major Faults are Detected:

FIG. 5 is a diagram illustrating an example display of a fault code on the display unit DS1 when major faults of multiple types have been detected. When no fault has occurred, then the differential pressure transmitter 1 displays the measured value on the display unit DS1 (A). Here let us assume that two types of major faults, major fault 1 and major fault 2, are detected.

In this case, the differential pressure transmitter 1 terminates the display of the measured value on the display unit DS1, and instead of the measured value, displays, on the display unit DS1, the fault code "ERR 01", indicating the detail of the major fault 1 (B). Then, after a specific time interval has elapsed, the display unit DS1 is given a blank display (C) over a specific time interval. Then, after this interval of a blank display, the fault code "ERR 02", indicating the detail of the major fault 2, is displayed on the display unit DS1 (D). Then, after a specific time interval has elapsed, the display unit DS1 is given a blank display over a specific time interval (E), after which the display of the fault code "ERR 01", indicating the detail of the major fault 1, is restored (B). The same operation is repeated thereafter.

Repeating this type of operation causes the fault code "ERR 01", which indicates the detail of the major fault 1, and the fault code "ERR 02", which indicates the detail of the major fault 2, to be displayed alternatingly on the display unit DS1, with blank display intervals interposed therebetween.

Doing so makes it possible to provide clear notification of the distinction between the fault code indicating the detail of the major fault 1 and the fault code indicating the detail of the major fault 2 through enhancing the difference in the content of the display through the interposition of the blank display intervals therebetween.

That is to say, if there were no blank display time interval, then if, for example, "ERR 06" were displayed for the fault code that indicates the detail of the major fault 1 and, for example, "ERR 08" were displayed for the fault code that indicates the detail of the major fault 2, then the part that changes is small, and thus there is a risk that the change of the code may be overlooked. In contrast, the provision of a blank display interval when switching the fault code provides a clear notification that there is a change in the fault code, making it possible to eliminate the risk that the change in the code will be overlooked.

Note that in this example, for simplicity in the explanation, it was assumed that two types of major faults, major fault 1 and major fault 2, had been detected, but even when more types of major faults have been detected, still the fault codes that indicate the details of the major faults that have been detected may be displayed, switching sequentially, in the same manner on the display unit DS1, with blank display intervals interposed therebetween.

Figure 6:
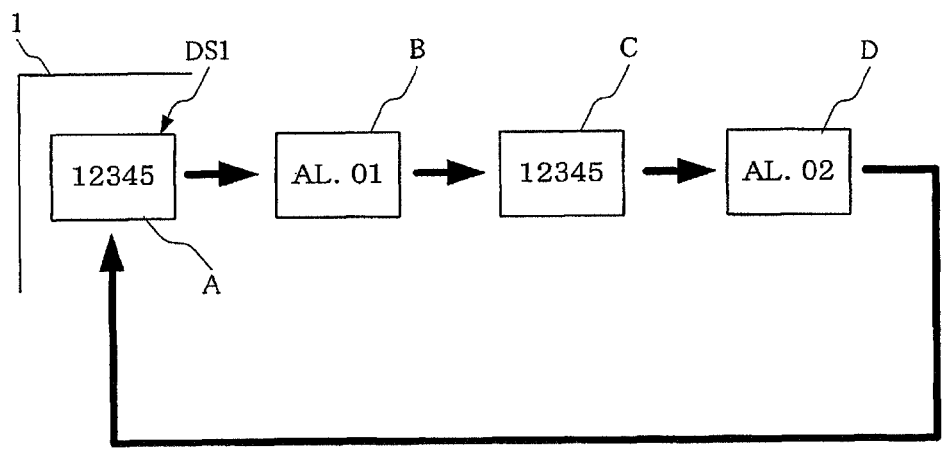
FIG. 6 is a diagram for explaining an example display of a fault code in a case wherein minor faults of a plurality of types have been detected.

When Multiple Types of Minor Faults are Detected:

FIG. 6 is a diagram illustrating an example display of a fault code on the display unit DS1 when minor faults of multiple types have been detected. When no fault has occurred, then the differential pressure transmitter 1 displays the measured value on the display unit DS1 (A). Here let us assume that two types of minor faults, minor fault 1 and minor fault 2, are detected.

In this case, the differential pressure transmitter 1 interrupts the display of the measured value on the display unit DS1, and displays, on the display unit DS1, the fault code "AL. 01", indicating the detail of the later fault 1 (B). Then, after a specific time interval has elapsed, the display unit DS1 displays the measured value over a specific time interval (C). Then, after this display of the measured value, the fault code "AL. 02", indicating the detail of the minor fault 2, is displayed on the display unit DS1 (D), and after a specified amount of time has elapsed, the display of the measured value is restored (A). The same operation is repeated thereafter.

Repeating this type of operation causes the fault code "AL. 01", which indicates the detail of the minor fault 1, and the fault code "AL. 02", which indicates the detail of the minor fault 2, to be displayed alternatingly on the display unit DS1, with the measured value interposed therebetween.

Doing so makes it possible to provide clear notification of the distinction between the fault code indicating the detail of the minor fault 1 and the fault code indicating the detail of the minor fault 2 through enhancing the difference in the content of the display through the interposition of the measured value display intervals therebetween.

That is to say, if there were no interposed measured value time intervals, then if, for example, "AL. 06" were displayed for the fault code that indicates the detail of the minor fault 1 and, for example, "AL. 08" were displayed for the fault code that indicates the detail of the minor fault 2, then the part that changes is small, and thus there is a risk that the change of the code may be overlooked. In contrast, the interposition of the measured value intervals when switching the fault code provides a clear notification that there is a change in the fault code, making it possible to eliminate the risk that the change in the code will be overlooked.

Note that in this example, for simplicity in the explanation, it was assumed that two types of minor faults, minor fault 1 and minor fault 2, had been detected, but even when more types of minor faults have been detected, still the fault codes that indicate the details of the minor faults that have been detected may be displayed, switching sequentially, in the same manner on the display unit DS1, with measured value interposed therebetween.

Figure 7:
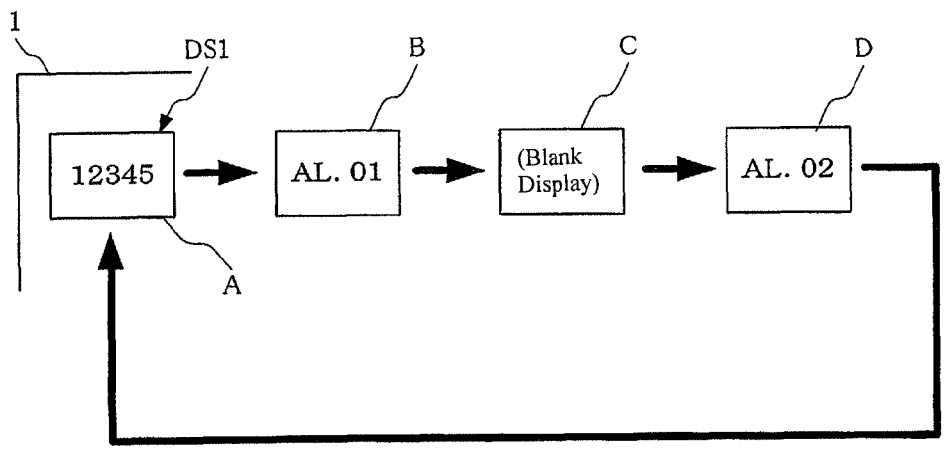
FIG. 7 is a diagram for explaining another example display of a fault code in a case wherein minor faults of a plurality of types have been detected.

When Multiple Types of Minor Faults are Detected:

FIG. 7 is a diagram illustrating another example display of a fault code on the display unit DS1 when minor faults of multiple types have been detected. When no fault has occurred, then the differential pressure transmitter 1 displays the measured value on the display unit DS1 (A). Here let us assume that two types of minor faults, minor fault 1 and minor fault 2, are detected.

In this case, the differential pressure transmitter 1 interrupts the display of the measured value on the display unit DS1, and displays, on the display unit DS1, the fault code "AL. 01", indicating the detail of the later fault 1 (B). Then, after a specific time interval has elapsed, the display unit DS1 is given a blank display (C) over a specific time interval. Then, after this blank display interval, the fault code "AL. 02", indicating the detail of the minor fault 2, is displayed on the display unit DS1 (D), and after a specified amount of time has elapsed, the display of the measured value is restored (A). The same operation is repeated thereafter.

Repeating this type of operation causes the measured value and a group of fault codes indicating the details of the minor faults to be displayed switching alternatingly on the display unit DS1, where, in the group of fault codes that indicate the details of the minor faults, the fault code "AL. 01", which indicates the detail of the minor fault 1, and the fault code "AL. 02", which indicates the detail of the minor fault 2, to be displayed alternatingly, with blank display intervals interposed therebetween.

Doing so makes it possible to provide clear notification of the distinction between the fault code indicating the detail of the minor fault 1 and the fault code indicating the detail of the minor fault 2 through enhancing the difference in the content of the display through the interposition of the measured value display intervals therebetween, or through enhancing the difference in the content of the display through the position of the blank display intervals.

Note that in this example, for simplicity in the explanation, it was assumed that two types of minor faults, minor fault 1 and minor fault 2, had been detected, but even when more types of minor faults have been detected, still the measured value and the group of fault codes that indicate the details of the minor faults may be displayed alternatingly, switching sequentially in the group of the fault codes that indicate the details of the minor faults, to display the fault codes that indicate the details of the minor faults, in the same manner, on the display unit DS1, with blank display intervals interposed therebetween.

Figure 8:
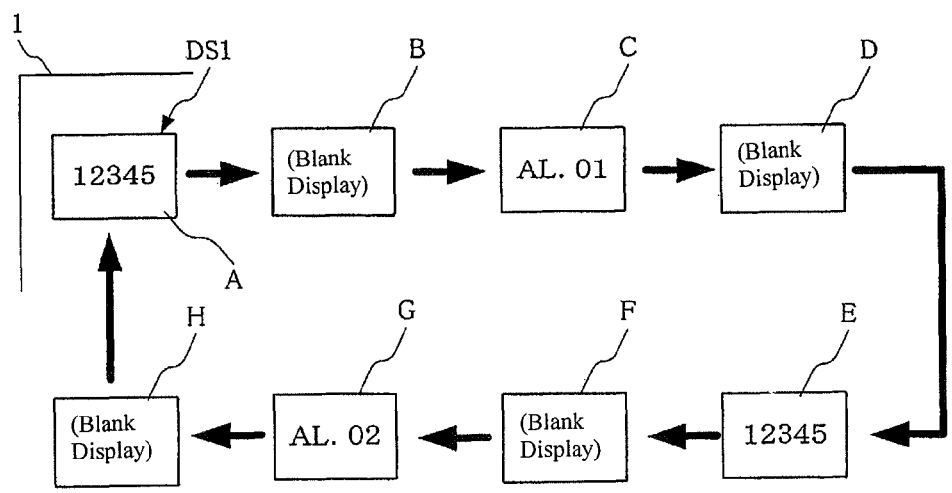
FIG. 8 is a diagram for explaining a further example display of a fault code in a case wherein minor faults of a plurality of types have been detected.

When Multiple Types of Minor Faults are Detected:

While, in the example illustrated in FIG. 6, a blank display interval was provided between the interval for displaying the measured value and the interval for displaying the fault code that indicates the detail of the minor fault, a blank display interval may be provided therebetween, as illustrated in FIG. 8.

Figure 9:
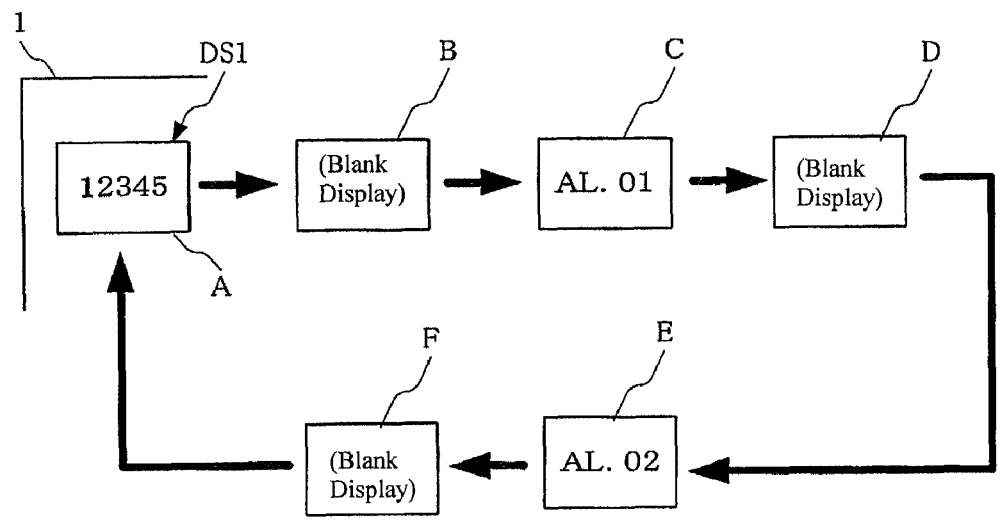
FIG. 9 is a diagram for explaining yet another example display of a fault code in a case wherein minor faults of a plurality of types have been detected.

When Multiple Types of Minor Faults are Detected:

While, in the example illustrated in FIG. 7, a blank display interval was provided between the interval for displaying the measured value and the interval for displaying the fault code that indicates the detail of the minor fault, a blank display interval may be provided therebetween, as illustrated in FIG. 9.

Display Example 3

Major Faults and Minor Faults Mixed Together

In display examples 1 and 2, an example of a display for when only major faults were detected and an example of a display for when only minor faults were detected were explained. In practice, major faults and minor faults may be mixed together. When a major fault has occurred, the measured value will be unreliable, regardless of how many minor faults have occurred.

In consideration of this, in the next example display, it is only when all of the faults that are detected are minor faults that the fault codes that indicate the details of the minor faults will be displayed using the methods as explained in FIG. 6 through FIG. 9, and when major faults and minor faults are mixed together, then the fault codes indicating the details of the major faults and the fault codes indicating the details of the minor faults will be displayed on the display unit DS1 with blank display intervals interposed therebetween.

Figure 10:
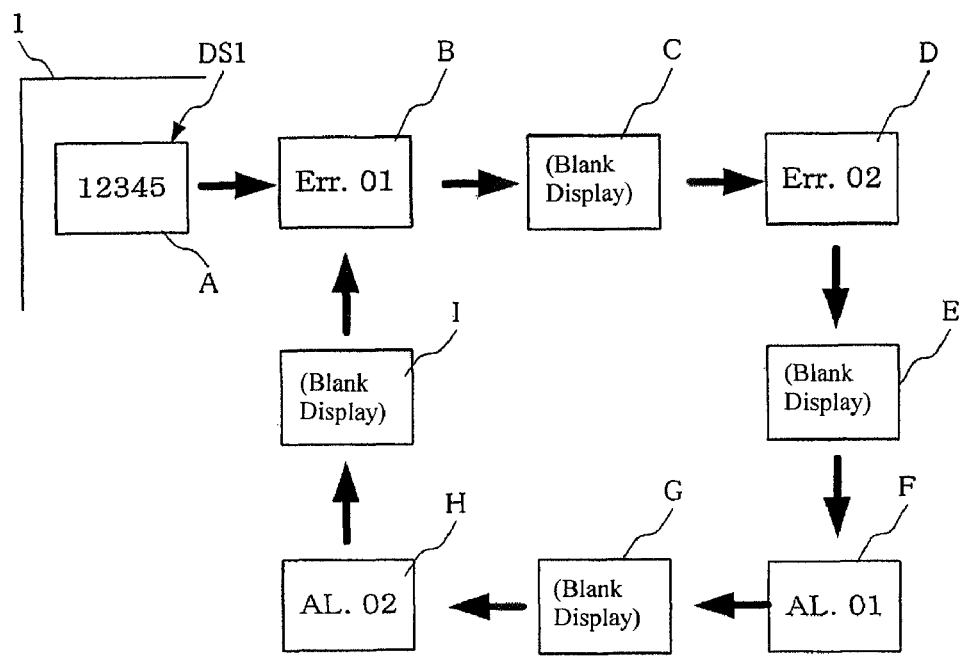
FIG. 10 is a diagram for explaining an example display of a fault code when a mixture of major faults and minor faults has been detected.

FIG. 10 is a diagram for explaining an example display of a fault code when a mixture of major faults and minor faults has been detected, and when no fault has been detected, the differential pressure transmitter 1 displays the measured value of the display unit DS1 (A). Here let us assume that two types of major faults, major fault 1 and major fault 2, are detected and that two types of minor faults, minor fault 1 and minor fault 2, are detected.

In this case, the differential pressure transmitter 1 terminates the display of the measured value on the display unit DS1, and instead of the measured value, displays, on the display unit DS1, the fault code "ERR 01", indicating the detail of the major fault 1 (B). Then, after a specific time interval has elapsed, the display unit DS1 is given a blank display (C) over a specific time interval. Then, after this blank display interval, the fault code "ERR 02", indicating the detail of the major fault 2, is displayed on the display unit DS1 (D), and after a specified amount of time has elapsed, a blank display interval is caused on the display unit DS1 (E).

Next, in the differential pressure transmitter 1, the fault code "AL. 01", indicating the detail of the minor fault 1, is displayed on the display unit DS1 (F), and after a specified amount of time has elapsed, a blank display interval is caused on the display unit DS1 (D). Then, after this blank display interval, the fault code "AL. 02", indicating the detail of the minor fault 2, is displayed on the display unit DS1 (H), after a specified amount of time has elapsed, a blank display interval is caused on the display unit DS1 (I), after which the fault code "ERR 01", indicating the detail of the major fault 1, is restored (B). The same operation is repeated thereafter.

Repeating this type of operation causes the fault code "ERR 01", which indicates the detail of the major fault 1, the fault code "ERR 02", which indicates the detail of the major fault 2, the fault code "AL. 01", which indicates the detail of the minor fault 1, and the fault code "AL. 02", which indicates the detail of the minor fault 2, to be displayed switching sequentially on the display unit DS1, with a blank display interval interposed therebetween.

Doing so makes it possible to provide clear notification of the distinction between the fault code indicating the detail of the major fault 1 and the fault code indicating the detail of the major fault 2 through enhancing the difference in the content of the display, and of the distinction between the fault code indicating the detail of the minor fault 1 and the fault code indicating the detail of the letter fault 2 through enhancing the difference in the content of the display, through the interposition of the blank display intervals therebetween.

Note that while in this example the fault codes for the group of major faults was display first followed by the displaying of the fault codes for the minor faults, instead the fault codes for the group of minor faults may be display first followed by the displaying of the fault codes for the major faults, or the fault codes for the group of major faults and the fault codes for the minor faults may be displayed mixed with each other.

Furthermore while in this example, for simplicity in the explanation, it was assumed that two types of major faults, major fault 1 and major fault 2, had been detected for the major faults, and two types of minor faults, minor fault 1 and minor fault 2, had been detected for the minor faults, even when more types of major faults and minor faults have been detected, still the fault codes that indicate the details of the major faults and fault codes that indicate the details of the minor faults that have been detected may be displayed, switching sequentially, in the same manner on the display unit DS1, with blank display intervals interposed therebetween.

Figure 11:
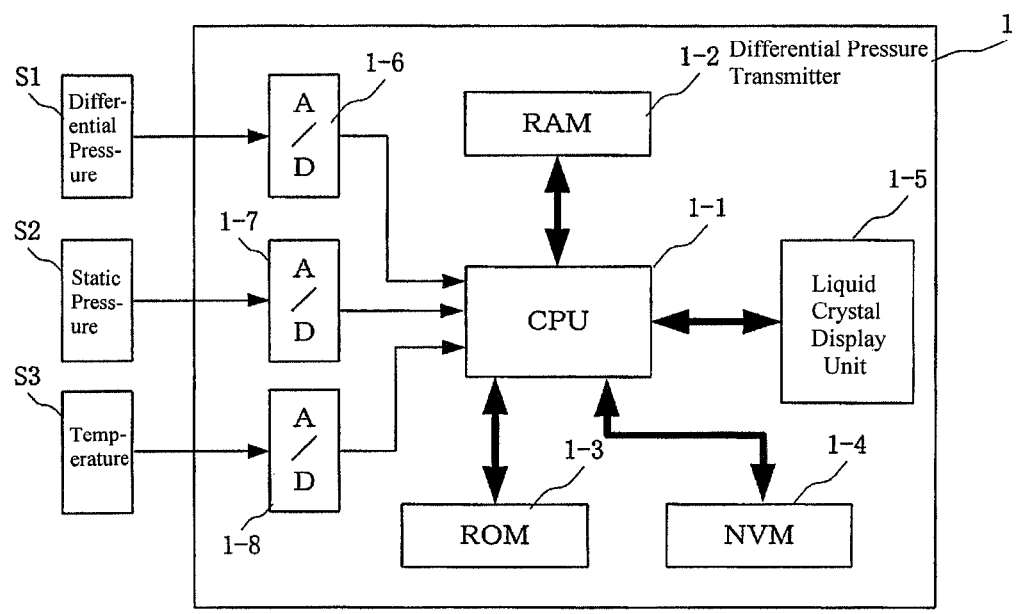
FIG. 11 is a diagram illustrating schematically the hardware structure of a differential pressure transmitter.

The processing operations in the differential pressure transmitter 1 will be explained in detail for the example in the display example, described above. FIG. 11 illustrates schematically the hardware structure of the differential pressure transmitter 1. In this figure, 1-1 is a CPU, 1-2 is a RAM, 1-3 is a ROM, 1-4 is an NVM (Non-Volatile Memory), 1-5 is a liquid crystal display unit, S1 is a differential pressure sensor, S2 is a static pressure sensor, S3 is a temperature sensor, and 1-6 through 1-8 are A/D converters. The differential pressure transmitter 1 includes also the constituent elements of the differential pressure sensor S1, the static pressure sensor S2, and the temperature sensor S3.

The CPU 1-1 receives a signal indicating the static pressure from the static pressure sensor S1 through the A/D converter 1-6, a signal indicating the static pressure from the static pressure sensor S2, inputted through the A/D converter 1-7, and a signal indicating the temperature, indicated through the A/D converter 1-8, and, while accessing the RAM 1-2 and the NVM 1-4, performs operations in accordance with a program that is stored in the ROM 1-3.

The ROM 1-3, stores, as programs that are unique to the present example of embodiment, a measured value displaying program for calculating, and displaying on the liquid crystal display unit 1-5, a measured value by performing various types of calculation processes on the signal indicating the differential pressure from the differential pressure sensor S1, a diagnostic program for detecting various types of faults, defined in advance, and a fault code displaying program for displaying fault codes on the liquid crystal display unit 1-5 based on the results of diagnostics in accordance with the diagnostic program.

Figure 12:
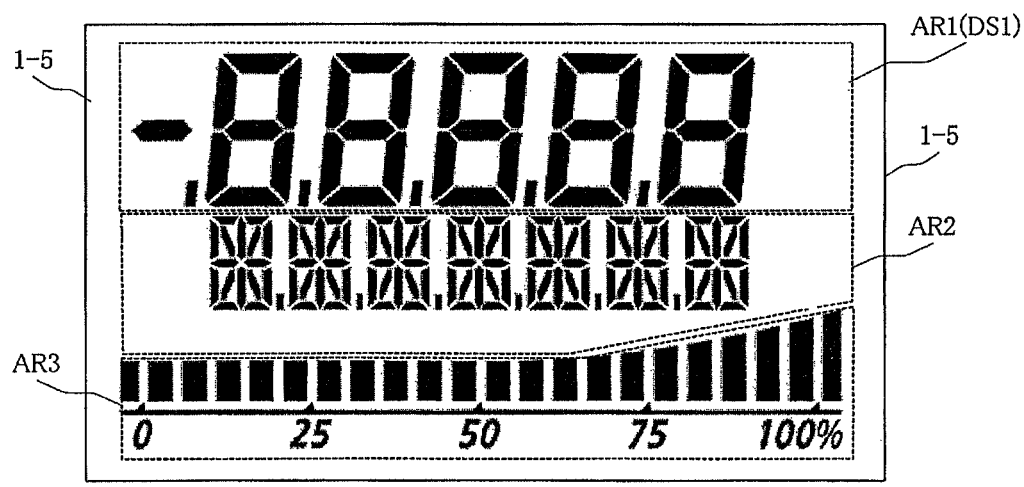
FIG. 12 is a diagram illustrating a display pattern in a liquid crystal display unit of the differential pressure transmitter.

FIG. 12 illustrates a display pattern in the liquid crystal display unit 1-5. In this display pattern, AR1 is a display region for the measured value, AR2 is a display region for various types of supplemental information, and AR3 is a display region for displaying a bar graph of measured values, where the display region AR1 has, as its critical structural elements, 7-segment groups, and the display region AR2 has, as its critical structural elements, 16-segment groups. In this display pattern, the display region AR1 corresponds to the display unit DS1 in the above example display.

FIG. 13 shows major fault diagnostic items that are executed by the diagnostic program, and fault codes that are outputted when major faults are detected. FIG. 14 shows minor fault diagnostic items that are executed by the diagnostic program, and fault codes that are outputted when minor faults are detected. In FIG. 13 and FIG. 14, the diagnostic items are displayed in order of declining seriousness. In the present example of embodiment, detail table TB1, as illustrated in FIG. 13, and detail table TB2, as illustrated in FIG. 14, are stored in the ROM 1-3.

Figure 15:
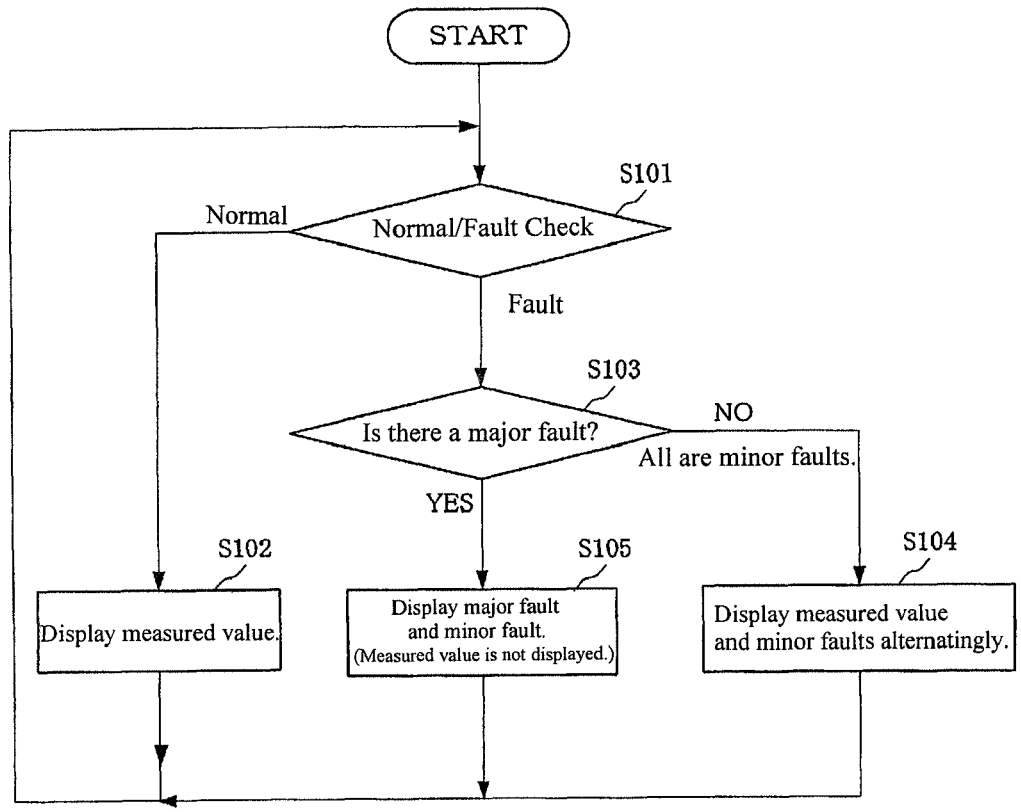
FIG. 15 is a flow chart illustrating the distinctive processing operations executed by the CPU of the differential pressure transmitter.

The flow chart illustrated in FIG. 15 will be used to explain the processing operations performed by the CPU 1-1 in accordance with the diagnostic program and the fault code displaying program stored in the ROM 1-3. Note that the flow chart illustrated in FIG. 15 illustrates the overall processing operations that are performed in cooperation by the diagnostic program and the fault code displaying program.

The CPU 1-1 executes the diagnostic program to check for a normal/fault state for each of the diagnostic items (Step S101). Here if there are neither major faults nor a minor faults, and all is normal (Step S101: Normal), then the measured value that is obtained is displayed, by the measured value displaying program, onto the liquid crystal display unit 1-5 (Step S102).

In contrast, if there is a major fault or a minor fault, and a determination is made that there is a fault (Step S101: Fault), then a check is made as to whether or not a major fault is included in the faults (Step S103). Here if all of the faults are minor faults, and there are no major faults included (Step S103: No), then, as illustrated in FIG. 6, for example, the fault codes that indicate the details of the minor faults are displayed, switching sequentially, on the display area AR1 (DS1) of the liquid crystal display unit 1-5, with the measured value interposed therebetween (Step S104). In this case, the fault codes that indicate the details of the minor faults are displayed in the sequence of descending seriousness following the table TB2, illustrated in FIG. 14.

If even a single major fault is included (Step S103: Yes), then, as illustrated in FIG. 10, for example, the display of the measured value is terminated, and the fault codes that indicate the details of the major faults and the fault codes that indicate the details of the minor faults are displayed sequentially, in the display area AR1 (DS1) of the liquid crystal display unit 1-5, with blank display intervals interposed therebetween (Step S105). In this case, the fault codes that indicate the details of the major faults are displayed in sequence of descending seriousness, in accordance with table TB1, illustrated in FIG. 13, and the fault codes that indicate the details of the minor faults are displayed in sequence, in order of descending seriousness, in accordance with table TB2, illustrated in FIG. 14. Note that the fault codes that indicate the details of the major faults may be displayed alone, rather than displaying the fault codes that indicate the details of the minor faults.

While in one example, the display region AR1 for the measured value in the liquid crystal display unit 1-5 was of 7-segment groups, it may instead be 16-segment groups. In a seven-segment group it is possible to display several alphabetic characters in addition to the 10 numeric characters, but the number thereof is limited. With 16 segments, it is possible to further expand the number of characters that can be displayed.

Additionally, a segment method need not necessarily be used, but rather an LCD of a dot matrix method may be used instead. The use of the segment method, such as a 7-segment group or a 16-segment group, is able to reduce power consumption, and the structure is inexpensive.

Additionally, while in one example, a liquid crystal display unit was used for the display unit 1-5, a display unit that uses light-emitting diodes (LEDs), cold cathode lighting, fluorescent light tubes, incandescent filaments, or the like, may be used instead.

Additionally, while in the above example displays and in the above example, a blank displayed interval is provided, instead, the displayed may be flashed immediately after the display is switched.

For example, if the display interval for one fault code is 3 seconds, then for the first second immediately after the display is switched, the display may be flashed at 0.25 second intervals, and lit for the remaining 2 seconds.

For example, when a dot matrix liquid crystal is used, then the display may be displayed in reverse video each time the display is changed, and if a color liquid crystal is used, then the color may be changed each time the display is changed.

In these systems there is no need to provide the blank displayed interval when the display is switched, but the noticeability is higher when combined with the blank display interval.

Additionally, in the above example displays and in the examples, the information that indicates the details of the faults, either major faults or a minor faults, need not necessarily be fault codes, but may instead be messages that display the details of the faults in actual text, or may be images displaying the details of the faults.

Figure 16:
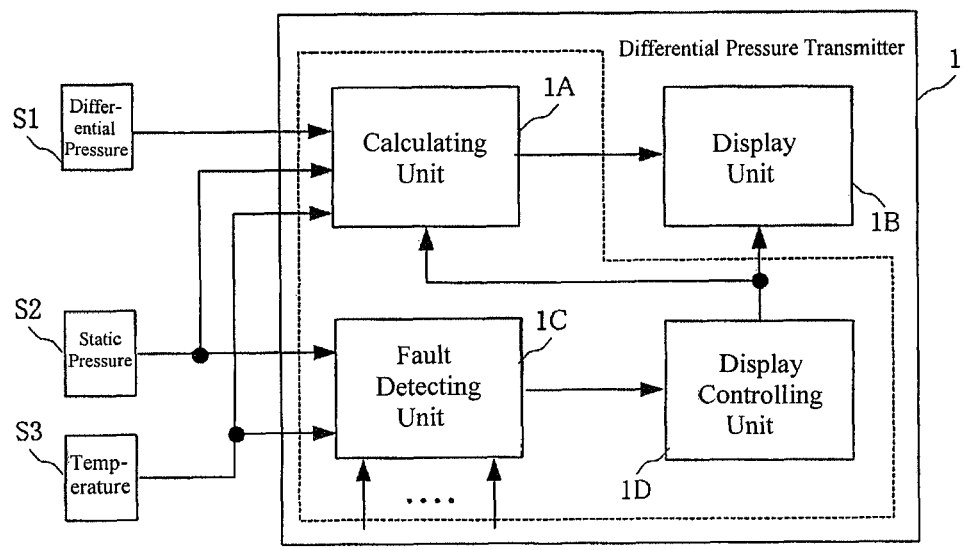
FIG. 16 is a functional block diagram of the critical portions of the differential pressure transmitter.
Figure 17:
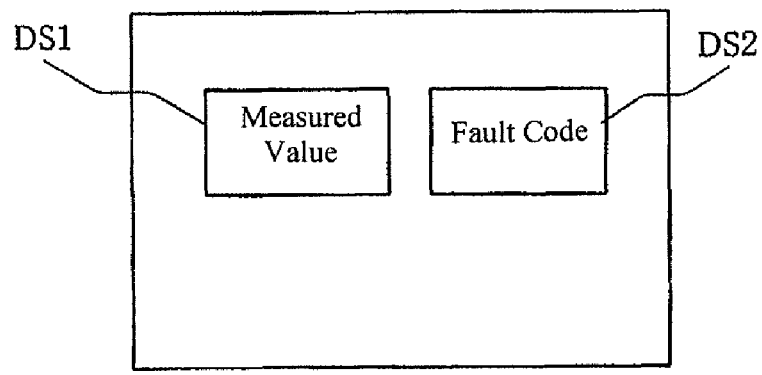
FIG. 17 is a diagram for explaining a conventional fault code displaying method.
Figure 18:
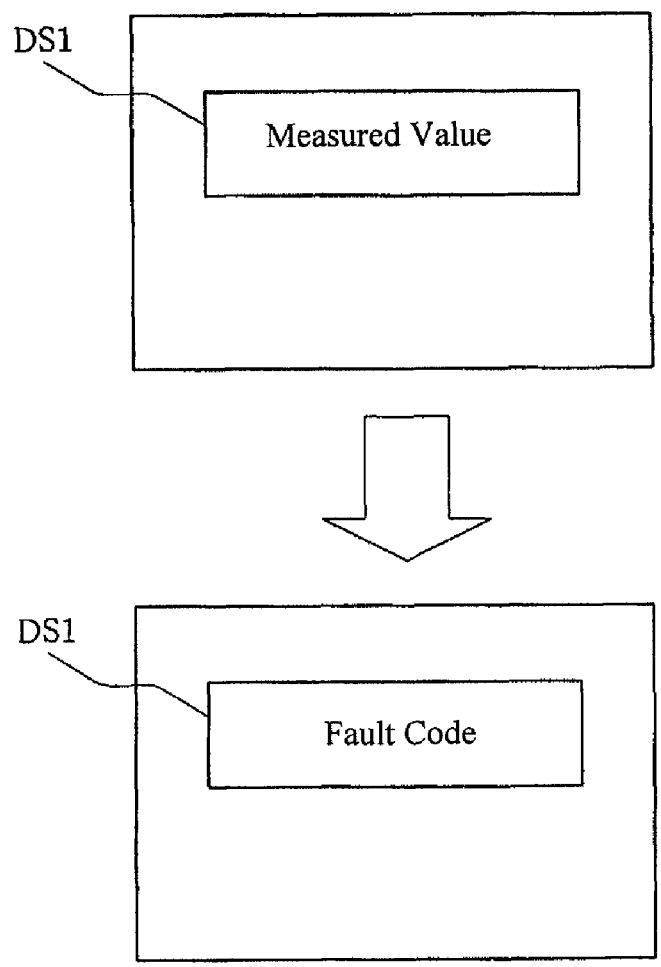
FIG. 18 is a diagram for explaining a display method for a fault code that is generally considered when installing only a display unit for the measured value.

FIG. 16 illustrates a functional block diagram of the critical components of a differential pressure transmitter 1 in the first example of embodiment. The differential pressure transmitter 1 is provided with a calculating unit 1A for calculating a measured value for a differential pressure, a display unit 1B, a fault detecting unit 1C, and a display controlling unit 1D.

The calculating unit 1A obtained measured values for differential pressures by performing specific calculating processes with a signal from the differential pressure sensor S1 as the input. The measured value for the differential pressure is displayed by the calculating unit 1A onto the display unit 1B. The fault detecting unit 1C detects various types of faults by inputting a signal indicating the differential pressure from the differential pressure sensor S1, a signal indicating the static pressure from the static pressure sensor S2, and a signal indicating the temperature from the temperature sensor S3.

The display controlling unit 1D, when, based on the faults detected by the fault detecting unit 1C, there is even one major fault in the faults, displays on the display unit 1B, instead of the measured value, the fault codes that indicate the details of the major faults and the fault codes that indicate the details of the minor faults, switched sequentially with blank display intervals interposed therebetween, and if all of the faults are minor faults, then the fault codes indicating the details of the minor faults are displayed on the display unit 1B along with the measured values. The calculating unit 1A, the fault detecting unit 1C, and the display controlling unit 1D are achieved as processing functions of the CPU 1-1.

Note that in the structure illustrated in FIG. 16, one may consider also a case wherein the temperature sensor S3 or the static pressure sensor S2 is not provided. In this case, the calculating unit 1A converts into a measured value, to be displayed on the display unit 1B, the differential pressure detected by the differential pressure sensor S1. The conversion into the measured value from the differential pressure by the calculating unit 1A is included in the calculations by the calculating means referenced in the present invention.

The measuring device according to the present invention is not limited to a differential pressure transmitter, but rather may be applied also to odometers and trip meters equipped in automobiles, and the like.

The invention claimed is:

1. A measuring device comprising:
   a sensor detecting a specific physical quantity;
   a calculating unit calculating a measured value based on a physical quantity detected by the sensor;
   a fault detector detecting a type 1 fault that influences the reliability of the measured value and a type 2 fault that does not influence the reliability of the measured value;
   a display unit displaying a measured value and information indicating the details of at least one of a type 1 fault and information indicating the details of a type 2 fault; and
   a display controller controlling the display unit so as to display, instead of the measured value, information indicating the detail of the type 1 fault when the fault that has been detected by the fault detecting means is a type 1 fault, and for controlling the display unit to display information indicating the detail of the type 2 fault, together with the measured value when the fault detected by the fault detecting means is a type 2 fault.

2. The measuring device as set forth in claim 1, wherein:
   the display controller, when the fault detected by the fault detector is a type 2 fault, displays to the display unit the information indicating the detail of the detected type 2 fault and the measured value, switching alternatingly.

3. The measuring device as set forth in claim 1, wherein the display controller:
   when faults detected by the fault detector are a plurality of types of type 1 faults, displays on the display unit, instead of the measured value, information indicating the details of the faults of the different types of the detected type 1 faults, switching sequentially with predetermined blank display intervals interposed therebetween; and,
   when the faults detected by the fault detector are a plurality of different types of type 2 faults, the information indicating the details of the faults of the different types of type 2 faults is displayed on the display unit, switching sequentially, with the measured value interposed therebetween.

4. The measuring device as set forth in claim 1, wherein the display controller:
   when faults detected by the fault detector are a plurality of types of type 1 faults, displays on the display unit, instead of the measured value, information indicating the details of the faults of the different types of the detected type 1 faults, switching sequentially with predetermined blank display intervals interposed therebetween; and,
   when faults detected by the fault detector are a plurality of types of type 2 faults, displays on the display unit, interrupting the display of the measured value, information indicating the details of the faults of the different types of the detected type 2 faults, switching sequentially with predetermined blank display intervals interposed therebetween.

5. The measuring device as set forth in claim 1, wherein the display controller:
   when the faults detected by the fault detector are all type 2 faults only, the information indicating the details of the type 2 faults is displayed on the display unit together with the measured value.

6. The measuring device as set forth in claim 5, wherein the display controller
   when the faults detected by the fault detector include a type 1 fault and a type 2 fault, then information indicating the detail of the type 1 fault and information indicating the detail of the type 2 fault is displayed on the display unit, switching sequentially, with a specific blank display interval interposed therebetween.

7. The measuring device as set forth in claim 1, wherein:
   the display unit is structured from a segment group.

* * * * *